United States Patent [19]

Granderath

[11] Patent Number: 5,883,949
[45] Date of Patent: Mar. 16, 1999

[54] METHOD FOR A PRIVATE BRANCH COMMUNICATIONS EXCHANGE TO ACTIVATE A NIGHT SERVICE CONFIGURATION

[75] Inventor: Hartmut Granderath, Gauting, Germany

[73] Assignee: Siemens Aktiengesellschaft, Munich, Germany

[21] Appl. No.: 750,879

[22] PCT Filed: Jun. 22, 1995

[86] PCT No.: PCT/DE95/00808

§ 371 Date: Dec. 17, 1996

§ 102(e) Date: Dec. 17, 1996

[87] PCT Pub. No.: WO96/01016

PCT Pub. Date: Jan. 11, 1996

[30] Foreign Application Priority Data

Jun. 30, 1994 [DE] Germany .......................... 44 23 018.4

[51] Int. Cl.⁶ .............................. H04M 1/66; H04M 3/42; H04M 7/00; H04M 3/00
[52] U.S. Cl. .......................... 379/219; 379/200; 379/203; 379/212; 379/221; 379/223; 379/242; 379/258
[58] Field of Search .................................. 379/67, 88, 89, 379/200, 219, 201, 203, 212, 220, 221, 223, 242, 258

[56] References Cited

U.S. PATENT DOCUMENTS

| 3,867,581 | 2/1975 | Pommerening | 379/211 |
| 4,570,035 | 2/1986 | Pinede et al. | 379/164 |
| 5,535,256 | 7/1996 | Maloney et al. | 379/34 |

*Primary Examiner*—Fan S. Tsang
*Assistant Examiner*—Allan Hoosain
*Attorney, Agent, or Firm*—Hill & Simpson

[57] ABSTRACT

To set a night service configuration, a configuration control (KS) in the private branch communications exchange (NK) is activated from an internal or external handset or a switchboard position by dialing a call number. A sequence of numbers then entered is interpreted as an authorization code. The subscriber group for which incoming calls are to be diverted is selected by a sequence of numbers subsequently entered. A further sequence of dialed numbers determines the target handset or the target switchboard position for receiving the diverted calls. The configuration control (KS) then forms an administration and maintenance order, which is transmitted to the operating system of the private branch communications exchange.

3 Claims, 3 Drawing Sheets

METHOD FOR A PRIVATE BRANCH COMMUNICATIONS EXCHANGE TO ACTIVATE A NIGHT SERVICE CONFIGURATION

The present application is a national state application of PCT/DE95/00808 filed Jun. 22, 1995.

BACKGROUND OF THE INVENTION

The invention relates to a method for a private branch communications exchange to activate a night service configuration.

In relatively large private branch communications exchanges there is the possibility of setting up switchboard positions for a specifiable subscriber group. A switchboard position may comprise one or more attendant telephone stations, forming a group. The switchboard position serves the purpose of receiving and putting through calls—often these are to be only external calls—for the relevant subscriber group. If a switchboard position cannot perform this task, because for example the personnel operating the switchboard position is not present at the switchboard position, a so-called night service is activated for the subscriber group concerned. This activation of the night service may be performed directly at the switchboard position or from a handset authorized for this, by pressing a special button or dialling a code number or by a voice command. The activation of the night service is in many cases also referred to as "pulling the plug".

In the night service, the caller requests directed to a specific subscriber group are routed to a handset of the private branch communications exchange instead of to the switchboard position.

Common Reference DE 39 32 689 Al already discloses a method for the activation of a night service in a private branch communications exchange, in which the handset to which the call requests are diverted when the night service is activated can be determined when activating the night service by entering the call number associated with this handset. The problem underlying the known method is that of ensuring in the case where a private branch communications exchange is used jointly by a plurality of mutually dependent subscriber groups that, when activating the night service for one subscriber group, it is not possible to determine a handset of another subscriber group. To solve this problem, it is proposed according to the known method to store in a central memory information on the association of the handsets with a specific switchboard position and to use this information when activating the night service and determining the handset substituting to a certain extent the switchboard position concerned to perform a check for association of the handset with the subscriber group for which a night service is to be activated.

SUMMARY OF THE INVENTION

The object of the present invention is to specify a method for setting up night service configurations which is independent of the application of a private branch communications exchange and can be used universally with regard to customer wishes and the implementation of which can be performed with as few interventions as possible in existing structures of the private branch communications exchange.

In general terms the present invention is a method for a private branch communications exchange to activate a night service configuration, in which, while a switchboard position assigned to a respective subscriber group for receiving and passing on calls is taken out of operation, incoming calls for the subscriber group are put through to handsets or other switchboard positions. A configuration control is activated by dialling a call number from an internal or external handset or a switchboard position. A number sequence then entered is interpreted by the configuration control as an authorization code and is compared with stored number sequences for checking an authorization to access at least in principle. If the result of the comparison is positive, a subscriber group is selected by means of a subsequently entered number sequence. The entered authorization code is checked by the configuration control with regard to an authorization for the selection of this subscriber group. If authorization is recognized, the handset or the switchboard position which is intended for taking calls directed to the selected subscriber group is identified by means of a number sequence then entered. A corresponding administration and maintenance order is then formed by the configuration control and transmitted to the operating system of the private branch communications exchange.

Advantageous developments of the present invention are as follows.

When the configuration control is activated, an electronic logging is activated.

The administration and maintenance order is only transmitted to the operating system after a special symbol has been entered.

This object is achieved according to the invention by the features specified in the characterizing clause of patent claim 1.

The method according to the invention is essentially carried out by a configuration control, which may be regarded as part of a central control of the private branch communications exchange. As in the case of the activation of a conventional facility, this configuration control is addressed by a user and, in the course of further inputs by the user, creates one or more administration and maintenance orders, which are passed on to the operating system component of the private branch communications exchange.

An important advantage of the method according to the invention is the great freedom it offers in principle for the formation of a night service configuration. It is only by the authorization code that the user of the exchange may set desired restrictions. In principle, in the night service state any subscriber group can be diverted to any desired handset or switchboard position. In this case, a plurality of subscriber groups may be switched simultaneously to the same handset or the same switchboard position.

In particular in the case of an interconnection of private branch communications exchanges in each of which the method according to the invention is implemented, the call requests directed at a subscriber group of a first exchange can be diverted to a handset or a switchboard position of a second exchange. It is also possible at a handset or switchboard position of a first exchange to activate and set up a night service configuration in a second exchange.

A further, particularly important advantage of the method according to the invention is that the setting up of a night service configuration can be activated by a call number reserved in the private branch communications exchange, so that a night service configuration in the private branch communications exchange can also be set up via an external line (for example via a trunk line).

A logging of the information entered in the course of an activation of a night service configuration at a handset or a switchboard position serves for revealing attempted misuses and for investigating user errors.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGS. of which like reference numerals identify like elements, and in which:

DESCRIPTION OF THE PREFERRED EMBODIMENTS

Figure 1:
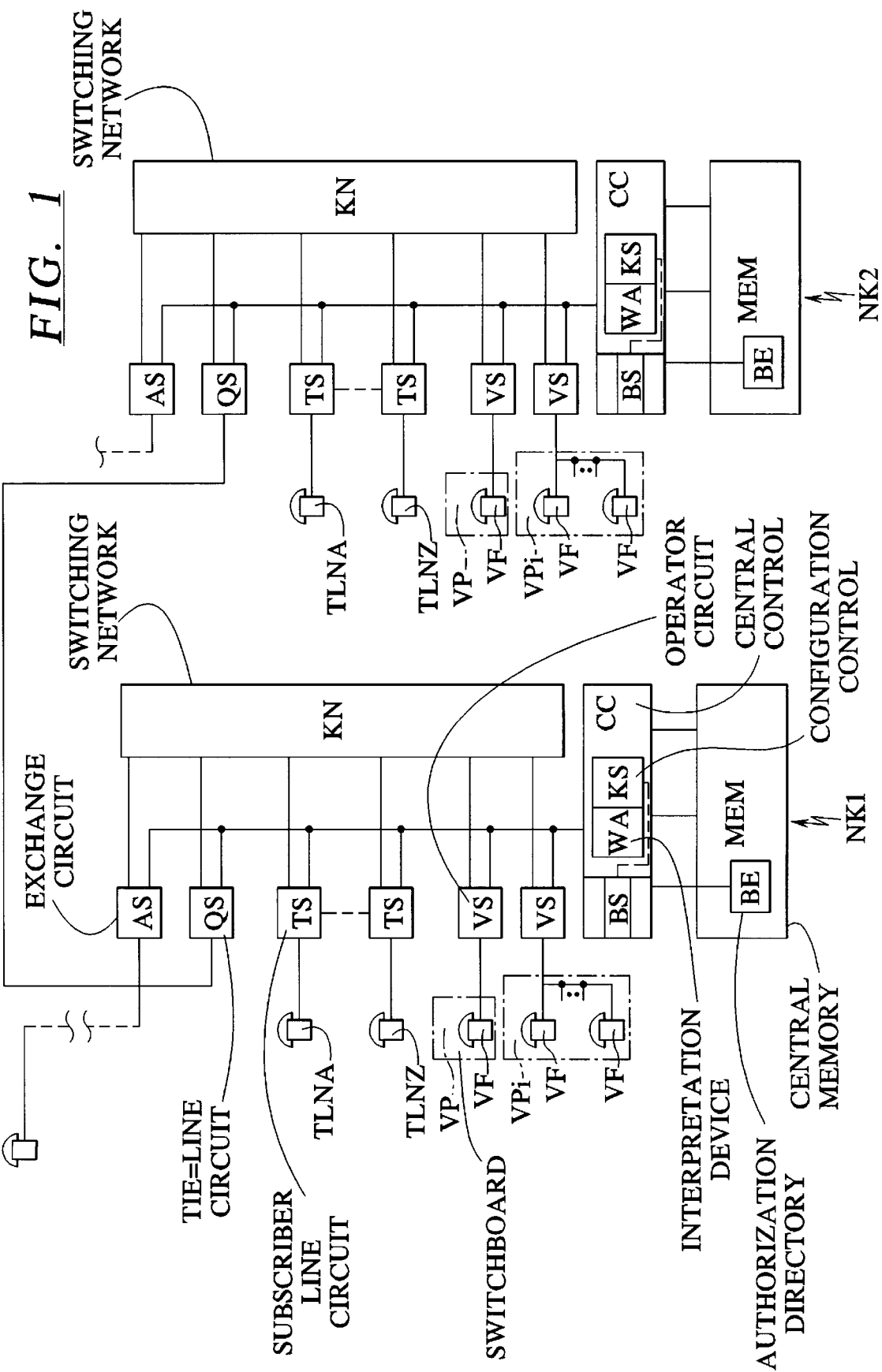
FIG. 1 shows two interconnected private branch communications exchanges, each in a diagrammatic representation.

Diagrammatically represented in FIG. 1 are two interconnected private branch communications exchanges, which are each made up of a central control CC, a central memory MEM, a switching network KN, a plurality of exchange circuits AS, a plurality of tie-line circuits QS, via which the two private branch communications exchanges NK1, NK2 are connected, a plurality of subscriber line circuits TS and handsets TLNn connected thereto and a plurality of operator circuits VS with attendant telephone stations VF connected thereto, which in each case form, individually or combined in groups, a switchboard position VP.

The central control CC has an operating system component BS, which with so-called AMOs (administration and maintenance orders) allows an extremely dynamic structuring of the private branch communications exchange. In this respect, reference is made in particular to the "Sonderausgabe telcom report und Siemens-Magazin COM" [special issue of Telcom Report and Siemens magazine COM], "ISDN im Büro" [ISDN in the Office], Siemens AG, 1985, pages 101 to 106, in which the function and task of the operating system component of a private branch communications exchange are described in more detail.

The central control CC has, furthermore, a selection code interpretation device WA and a configuration control KS, which can be activated by call number dialling.

Stored in the central memory MEM is an authorization directory BE, in which the individual authorizations and data on their extent of authorization are stored.

Figure 2A:
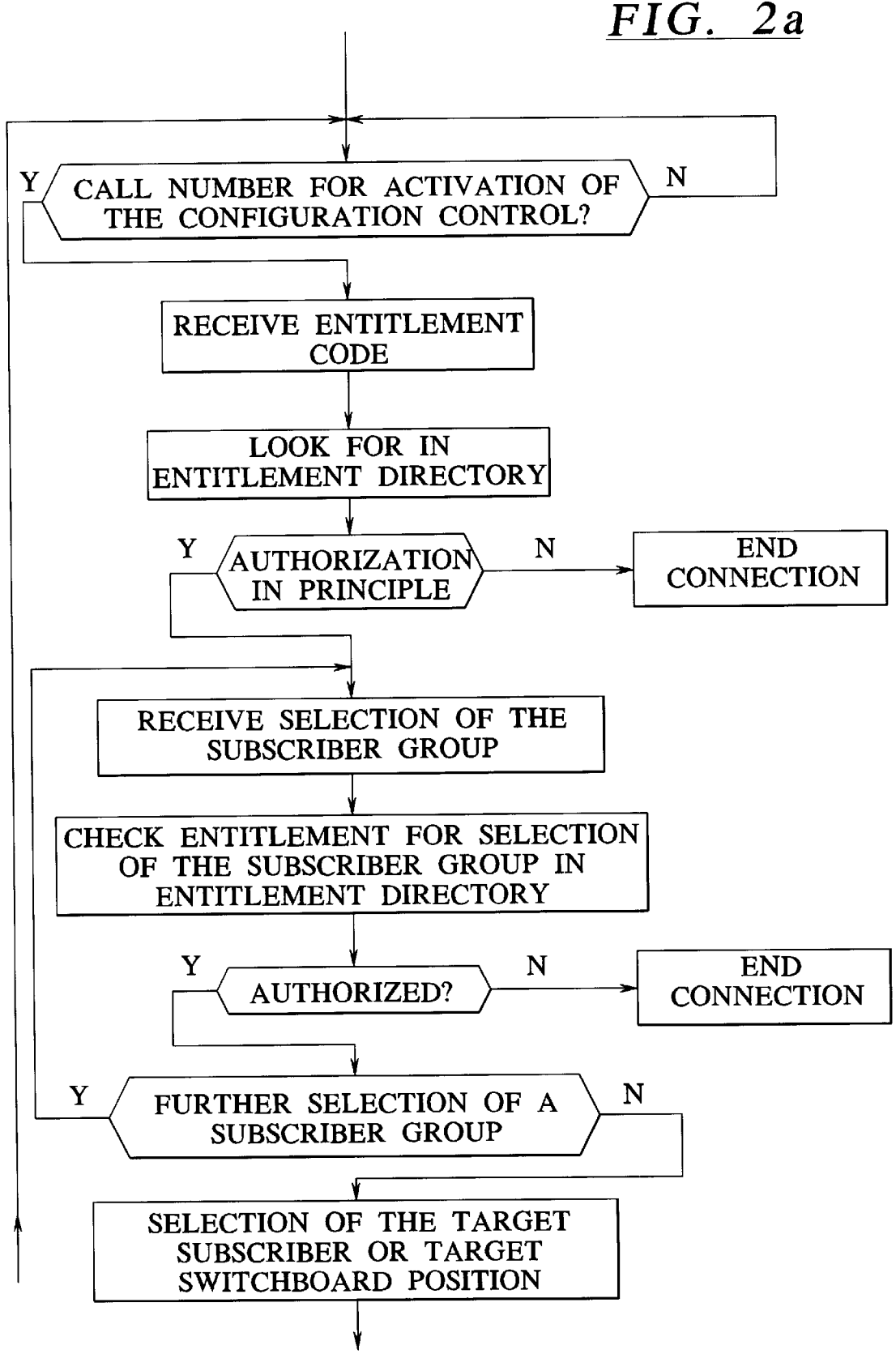
FIGS. 2a and 2b shows a graphic illustration of the main method steps.
Figure 2B:
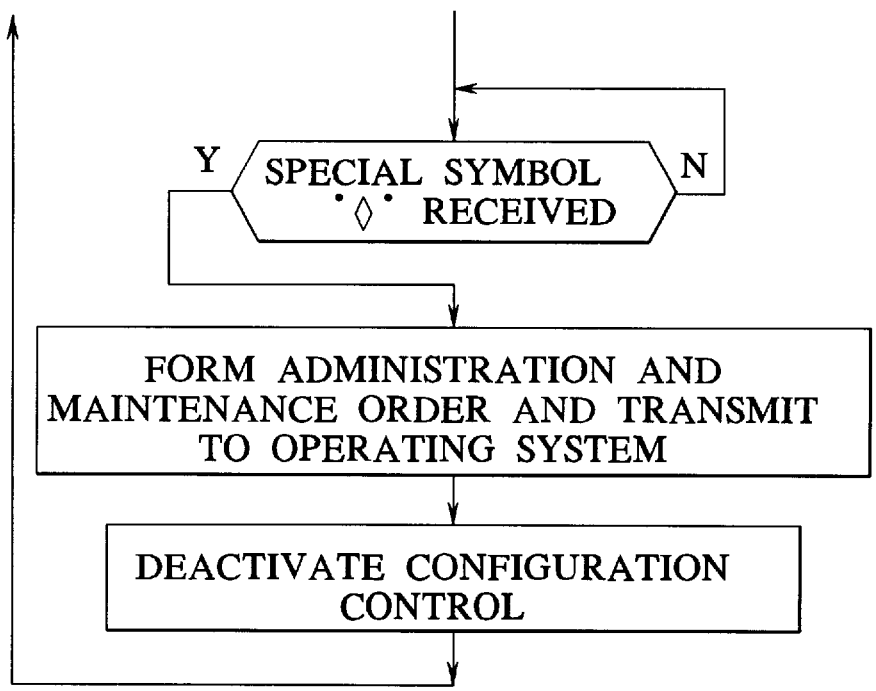

Graphically represented in FIG. 2 are the main procedural steps of the method according to the invention in the form of a flowchart. A call number for activating the night service is entered from any desired handset TLNA or from a switchboard position VP. The configuration control KS is then activated in the selection code interpretation device WA of the central control CC. A number sequence then entered by the user of the handset TLNA or switchboard position VP concerned is received by the configuration control KS as an authorization code. This authorization code is looked for in the authorization directory BE. To prevent misuse, it may be provided that, following repeated attempts to enter authorization codes which cannot be found in the authorization directory BE, the handset TLNA or the switchboard position VP from which the night service is to be activated is disabled.

If, however, the entered authorization code is found in the authorization directory BE, a number sequence then entered by the user for the selection of a subscriber group is interpreted and received. In the event that no such number sequence is entered by the user, the night service is usually activated in a preset configuration. If, however, a number sequence for the selection of a subscriber group is entered by the user concerned, information as to whether the subscriber group concerned may be selected under the authorization code is looked for in the authorization directory BE under the authorization code previously entered. If, during this check, it has been established that an authorization exists, further number sequences for the selection of further subscriber groups may be entered by the user, a check for authorization being performed in each case.

Once a selection of the subscriber groups has been completed, a number sequence then entered by the user for the selection of the target handset or the target switchboard position to which the call requests directed at the selected subscriber groups are to be put through when the night service is activated is interpreted. In this selection, user prompting may be performed by offering the user on the "display" of his handset a number of target handsets or target switchboard positions, for example in the form of associated call numbers. In the cases in which none of the targets offered is confirmed by the user, an entry for the desired selection of a target handset or a target switchboard position is expected. Even in the selection of the target handset or the target switchboard position, a checking of the authorization may be performed.

If the user enters a special symbol, for example a lozenge, the entire entry sequence is ended and an administration and maintenance order is formed by the configuration control KS, creating connection paths corresponding to the selection of subscriber groups and the selection of the target handset or the target switchboard position made by the user. After this administration and maintenance order is transmitted to the operating system component BS of the private branch communications exchange, the administration and maintenance order is carried out and the intended connections are set up.

A deactivation of the night service is accomplished in an analogous way again by dialling a call number, which for its part again activates the configuration control KS and, after checking for authorization, forms an administration and maintenance order, which cancels to a certain extent the administration and maintenance order transmitted to the operating system upon activation of the night service.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for a private branch communications exchange to activate a night service configuration using number sequences, in which, while a switchboard position assigned to a respective subscriber group for receiving and passing on calls is taken out of operation, incoming calls for said subscriber group are put through to handsets or other switchboard positions, comprising the steps of:

activating a configuration control by selectively dialing a call number from an internal handset or external handset or a switchboard position using a first call number sequence;

interpreting a second call number sequence then entered by said configuration control as an authorization code and comparing the authorization code to stored number sequences for checking an authorization to access a further subscriber group of night service configuration;

selecting, if the result of the comparison is positive, said subscriber group using a third number sequence by said configuration control;

identifying, if authorization is recognized, the selected handset or the switchboard position which is intended for taking calls directed to said selected subscriber group using a fourth call number sequence;

forming a corresponding administration and maintenance order by the configuration control and transmitting the order to the operating system of the private branch communications exchange.

2. The method as claimed in claim 1, wherein, when the configuration control is activated, an electronic logging is activated.

3. The method as claimed in claim 1, wherein the administration and maintenance order is only transmitted to the operating system after a special symbol has been entered.

* * * * *